United States Patent
Lee et al.

(10) Patent No.: US 10,628,681 B2
(45) Date of Patent: Apr. 21, 2020

(54) METHOD, DEVICE, AND NON-TRANSITORY COMPUTER READABLE MEDIUM FOR SEARCHING VIDEO EVENT

(71) Applicant: INDUSTRIAL TECHNOLOGY RESEARCH INSTITUTE, Hsinchu (TW)

(72) Inventors: Kual-Zheng Lee, Puzi (TW); Yung-Cheng Kao, Kaohsiung (TW); Hui-Hsiang Kao, Kaohsiung (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 163 days.

(21) Appl. No.: 16/002,685

(22) Filed: Jun. 7, 2018

(65) Prior Publication Data
US 2019/0180112 A1 Jun. 13, 2019

(30) Foreign Application Priority Data
Dec. 8, 2017 (TW) ............... 106143271 A (51) Int. Cl.
*G06F 3/00* (2006.01)
*G06K 9/00* (2006.01)
*G06F 16/783* (2019.01)
*G06T 7/00* (2017.01)

(52) U.S. Cl.
CPC ..... *G06K 9/00765* (2013.01); *G06F 16/7837* (2019.01); *G06K 9/00744* (2013.01)

(58) Field of Classification Search
CPC .. G06K 9/00; G06F 16/00; H04N 5/00; G06T 7/00
(Continued)

(56) References Cited

U.S. PATENT DOCUMENTS 7,801,328 B2   9/2010  Au
9,060,116 B2 * 6/2015  Kim ................. G08B 13/19656
(Continued)

FOREIGN PATENT DOCUMENTS

CN   101281593 B   7/2010
CN   103380619 A1  10/2013
(Continued)

OTHER PUBLICATIONS

Avila et al., "VSUMM: A mechanism designed to produce static video summaries and a novel evaluation method", Pattern Recognition Letters 32 (2011), pp. 56-68.
(Continued)

*Primary Examiner* — Abolfazl Tabatabai
(74) *Attorney, Agent, or Firm* — Muncy, Geissler, Olds & Lowe, P.C.

(57) ABSTRACT

The method for searching a video event includes: capturing a video; obtaining multiple pixels corresponding to the video; calculating a pixel difference value of each pixel by comparing frames at different timestamps in the video; dividing the video into multiple video segments, each video segment including a group of frames; determining a representative value for each pixel in each video segment according to the pixel difference value of each pixel; generating a metadata file which records the representative value for each pixel in each video segment; and searching an event in the video according to the metadata file.

24 Claims, 4 Drawing Sheets

(58) Field of Classification Search
USPC .......................................................... 382/103
See application file for complete search history.

(56) References Cited

U.S. PATENT DOCUMENTS

| | | | |
|---|---|---|---|
| 9,269,244 B2* | 2/2016 | Heier | G06Q 20/20 |
| 9,646,387 B2* | 5/2017 | Schwartz | G06T 7/20 |
| 2009/0231453 A1 | 9/2009 | Huang | |
| 2014/0178033 A1 | 6/2014 | He | |
| 2015/0189176 A1 | 7/2015 | Pacurariu | |
| 2016/0182921 A1 | 6/2016 | Martin | |
| 2017/0034483 A1 | 2/2017 | Aghdasi | |
| 2017/0041681 A1 | 2/2017 | Biderman | |

FOREIGN PATENT DOCUMENTS

| | | |
|---|---|---|
| CN | 103020991 B | 11/2015 |
| TW | I416404 B | 11/2013 |
| TW | I519167 B | 1/2016 |
| TW | 201607311 A | 2/2016 |

OTHER PUBLICATIONS

S. D. Thepade and A. A. Tonge, "An optimized key frame extraction for detection of near duplicates in contend based video retrieval," *2014 International Conference on Communication and Signal Processing*, Melmaruvathur, 2014, pp. 1087-1091.

Gonzalez-Diaz et al., "Temporal segmentation and keyframe selection methods for user-generated video search-based annotation", Expert System with Applications 42 (2015), pp. 488-502.

Kavitha et al., "VIBE: Background Detection and Subtraction for Image Sequences in Video", International Journal of Computer Science and Information Technologies, vol. 3 (5), 2012, pp. 5223-5226.

W. Shuigen, C. Zhen and D. Hua, "Motion Detection Based on Temporal Difference Method and Optical Flow field," *2009 Second International Symposium on Electronic Commerce and Security*, Nanchang, 2009, pp. 85-88.

Z. Ji, Y. Su, R. Qian and J. Ma, "Surveillance video summarization based on moving object detection and trajectory extraction," *2010 2nd International Conference on Signal Processing Systems*, Dalian, 2010. pp. V-250-V2-253.

Ma et al., "Motion Trajectory-Based Video Retrieval Classification, and Summarization", Video Search and Mining, SCI 287 2010, pp. 53-82.

J. C. Nascimento and J. S. Marques, "Performance evaluation of object detection algorithms for video surveillance," in *IEEE Transactions on Multimedia*, vol. 8, No. 4, pp. 761-774, Aug. 2006.

Gonzalez et al., "Digital Image Processing ($2^{nd}$ Ed)", NJ: Prentice Hall, 2001, http://web.ipac.caltech.edu/staff/fmasci/home/astro_refs/Digital_Image_Processing_2ndED.pdf. (797 pages in total).

* cited by examiner

METHOD, DEVICE, AND NON-TRANSITORY COMPUTER READABLE MEDIUM FOR SEARCHING VIDEO EVENT

CROSS-REFERENCE TO RELATED APPLICATION

This application claims the benefit of Taiwan application Serial No. 106143271, filed on Dec. 8, 2017, the subject matter of which is incorporated herein by reference.

TECHNICAL FIELD

The disclosure relates to a video processing method, and in particular to a method, device, and non-transitory computer readable medium for searching an event in the video quickly with the aid of the metadata file.

BACKGROUND

With advances in technology and user safety awareness, video surveillance equipment has been widely used in recent years, such as Internet Protocol (IP) cameras, digital video recorders (DVRs), and network video recorder (NVR). These devices can record video for the monitored area. When users need to access recorded video to find a specific event, a great amount of work and time is often required to search the huge surveillance video content for relevant clues. Therefore, there is a need for a method for searching a video event quickly.

SUMMARY

The disclosure relates to a method, device, and non-transitory computer readable medium for searching a video event. The event that the users are interested in can be found quickly by using the metadata file.

According to one embodiment, a method for searching a video event is provided. The method includes: capturing a video; obtaining multiple pixels corresponding to the video; calculating a pixel difference value of each pixel by comparing frames at different timestamps in the video; dividing the video into multiple video segments, each video segment including a group of frames; determining a representative value for each pixel in each video segment according to the pixel difference value of each pixel; generating a metadata file which records the representative value for each pixel in each video segment; and searching an event in the video according to the metadata file.

According to another embodiment, a device for searching a video event is provided. The device for searching a video event includes an image capture unit, a data conversion unit, a difference calculation unit, a representative value calculation unit, a file output unit, and an event search unit. The image capture unit is configured to capture a video. The data conversion unit is configured to obtain multiple pixels corresponding to the video. The difference calculation unit is configured to calculate a pixel difference value of each pixel by comparing frames at different timestamps in the video. The representative value calculation unit is configured to divide the video into multiple video segments, and to determine a representative value for each pixel in each video segment according to the pixel difference value of each pixel, each video segment including a group of frames. The file output unit is configured to generate a metadata file which records the representative value for each pixel in each video segment. The event search unit is configured to search an event in the video according to the metadata file.

According to still another embodiment, a non-transitory computer readable medium is provided. The non-transitory computer readable medium stores a program that, when executed by a computer, causes the computer to perform operations including: capturing a video; obtaining multiple pixels corresponding to the video; calculating a pixel difference value of each pixel by comparing frames at different timestamps in the video; dividing the video into multiple video segments, each video segment including a group of frames; determining a representative value for each pixel in each video segment according to the pixel difference value of each pixel; generating a metadata file which records the representative value for each pixel in each video segment; and searching an event in the video according to the metadata file.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Motion detection is a frequently used video analysis function when searching events in a video. Motion detection can detect events by investigating changes between frames in a video. Motion detection has two basic steps: pixel difference and event determination. The former detects the difference of a pixel in different frames. The latter can calculate the total amount of difference to determine whether or not a moving event is detected, or to decide whether to trigger a warning. These two steps may require parameters (such as thresholds) to be set in advance.

In most situations, a surveillance video is inspected because an event has occurred. That is, the time period and the location of the event are known. For example, the time period when the vehicle was stolen and the place where the vehicle parked are known. However, it may still take a lot of time to watch irrelevant video clips for a detected event because the event location is unpredictable. For example, at a road intersection having high traffic, users may only concern about the parking area. However, when the users inspect events in the video, they may see a large number of irrelevant video clips of the road.

Another method for searching events is post analysis. The recorded video is compressed and stored without first performing instant motion detection. After setting the search parameters, the compressed video is read, decoded and analyzed to search events related to the parameters. This practice may require repeatedly decoding the video for further analysis, thus consuming a lot of computing cost and time.

The above first method including instant motion detection may require parameters to be set in advance, and require certain amount of time to watch irrelevant moving areas in the video. The above second method includes post analysis, which sets the parameters after the video is stored and performs the video decoding, and thus consumes a lot of computing cost and time. In order to quickly filter a large number of videos, the present disclosure provides a method and a device for searching a video event.

Figure 1:
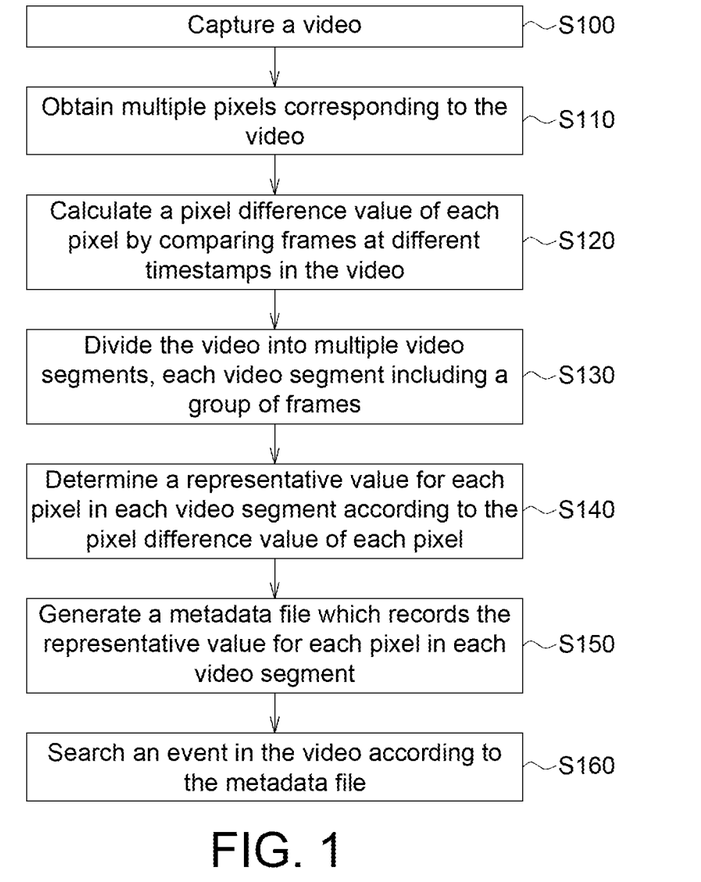
FIG. 1 shows a flowchart illustrating a method for searching an event according to an embodiment of the disclosure.

FIG. 1 shows a flowchart illustrating a method for searching an event according to an embodiment of the disclosure. The method includes the following steps. Step S100: capture a video. Step S110: obtain multiple pixels corresponding to the video. Step S120: calculate a pixel difference value of each pixel by comparing frames at different timestamps in the video. Step S130: divide the video into multiple video segments, each video segment including a group of frames. Step S140: determine a representative value for each pixel in each video segment according to the pixel difference value of each pixel. Step S150: generate a metadata file which records the representative value for each pixel in each video segment. Step S160: search an event in the video according to the metadata file.

The flowchart shown in FIG. 1 may be divided into two procedures: generation of the metadata file (steps S100 through S150) and event search (step S160). In one embodiment, the method shown in FIG. 1 may be implemented by a software program, which may be stored in a computer readable medium, such as hard drive, compact disk, flash drive, and memory. The computer readable medium may be non-transitory. The program, when executed by the computer, causes the computer to perform operations shown in FIG. 1. Each step is described in further detail with FIG. 2.

Figure 2:
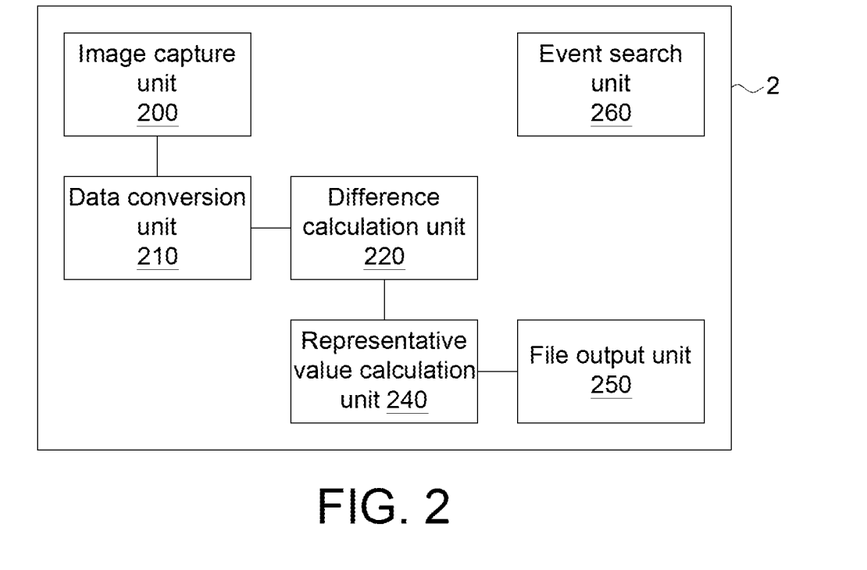
FIG. 2 shows a device for searching an event according to an embodiment of the disclosure.

FIG. 2 shows a device for searching an event according to an embodiment of the disclosure. The device for searching a video event 2 includes an image capture unit 200, a data conversion unit 210, a difference calculation unit 220, a representative value calculation unit 240, a file output unit 250, and an event search unit 260. The image capture unit 200 is configured to capture a video (step S100). The data conversion unit 210 is configured to obtain multiple pixels corresponding to the video (step S110). The difference calculation unit 220 is configured to calculate a pixel difference value of each pixel by comparing frames at different timestamps in the video (step S120). The representative value calculation unit 240 is configured to divide the video into multiple video segments, and to determine a representative value for each pixel in each video segment according to the pixel difference value of each pixel, each video segment including a group of frames (step S130 and step S140). The file output unit 250 is configured to generate a metadata file which records the representative value for each pixel in each video segment (step S150). The event search unit 260 is configured to search an event in the video according to the metadata file (step S160).

The device for searching an event 2 is, for example, an IP camera, a DVR, an NVR, and other video surveillance equipment. The image capture unit 200 may include at least one lens and an image sensor. The data conversion unit 210, the difference calculation unit 220, the representative value calculation unit 240, the file output unit 250, and the event search unit 260 may be individually implemented by software units or hardware units. Alternatively, some units may be combined and implemented as software, and some units may be combined and implemented as hardware. Units implemented as software may be loaded by a microprocessor to perform the corresponding functions. Units implemented as hardware may be implemented as microcontroller, microprocessor, digital signal processor, application specific integrated circuit (ASIC), digital logic circuit, analog circuit, or field programmable logic array (FPGA). The event search unit 260 may read the metadata file generated by the file output unit 250 to perform event search. Therefore, in one embodiment, the event search unit 260 may be disposed independently of the remaining units. For example, the image capture unit 200, the data conversion unit 210, the difference calculation unit 220, the representative value calculation unit 240, and the file output unit 250 may be integrated in a single hardware device, while the event search unit 260 may be implemented in another circuit chip or device.

After the image capture unit 200 captures the video in step S100, multiple pixels corresponding to the video may be obtained in step S110. For example, 1280×720 pixels may be obtained in the step S110 if the resolution of the video is 720P (1280×720). If the video is a grayscale image, each pixel may include one grayscale value ranging from 0-255; if the video is a color image, each pixel may include 3 values (RGB or YUV). Based on these values, step S120 may be performed to calculate the pixel difference.

In one embodiment, the step S110 may include down-sampling the video to obtain multiple pixels. The data conversion unit 210 is able to reduce the number of pixel data required in the computation by down-sampling, in order to reduce the computation time of step S210. For example, by performing down-sampling on a 720P (1280×720) video with a downscale factor equal to 16, 80×45 pixels may be obtained.

Figure 3:
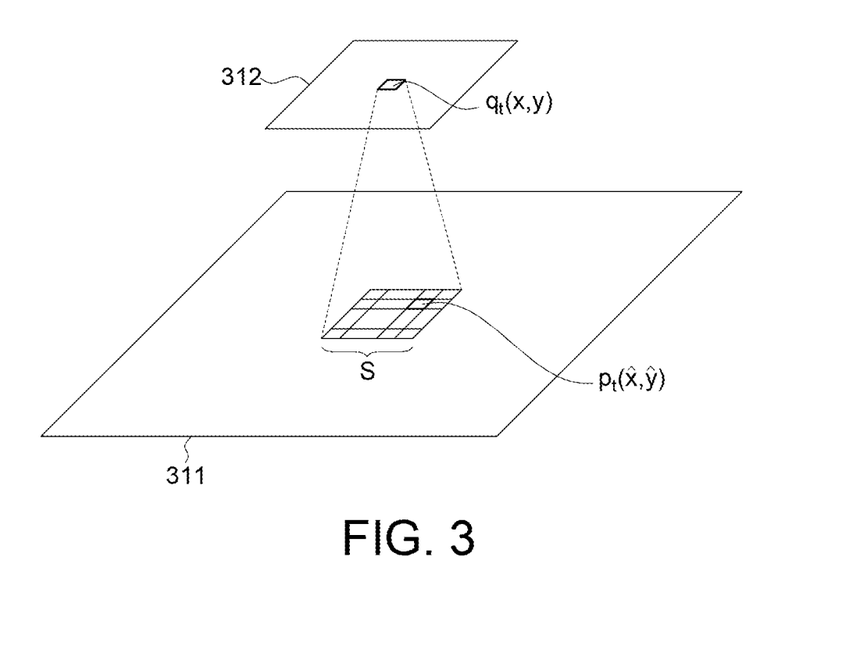
FIG. 3 shows the process of down-sampling a video according to an embodiment of the disclosure.

FIG. 3 shows the process of down-sampling a video according to an embodiment of the disclosure. The original image 311 is captured in the step S100. The down-sampled image 312 is obtained after down-sampling in the step S110. In this figure, s represents the downscale factor, $p_t$ is a pixel in the original image 311 at time t with coordinate $(\hat{x}, \hat{y})$. The pixel $p_t$ with coordinate $(\hat{x}, \hat{y})$ in the original image 311 before down-sampling is corresponding to a pixel $q_t$ with coordinate (x, y) in the down-sampled image 312 after down-sampling. The term L(p) will be used for representing the grayscale value of the pixel p in the following equations.

In one embodiment, the step S110 may include a down-sampling operation based on the average grayscale value. The corresponding equation is:

$$L(q_t) = \frac{1}{s \times s} \sum_{\hat{x}=s \times x}^{s \times x+s-1} \sum_{\hat{y}=s \times y}^{s \times y+s-1} L(p_t).$$

In another embodiment, the step S110 may include a down-sampling operation based on hopping or interval sampling. The corresponding equation is: $L(q_t)=L(p_t)$, where $\hat{x}=s \times x$, $\hat{y}=s \times y$.

In still another embodiment, the step S110 may include a down-sampling operation based on interpolation. Various down-sampling operations described above may also be applied to color values (e.g. luminance and chrominance). The downscale factor s may depend on the size of the input image, the required detection accuracy, and the like.

The down-sampling calculation method and the downscale factor used in the step S110 are not limited, and may be determined according to available hardware resource, computation time, and accuracy requirement. In addition, some IP cameras may have an additional video with a different image resolution. In one embodiment, the step S110 may include obtaining an additional video and obtaining the multiple pixels from the additional video. The additional video in the step S110 may be captured concurrently with the video in the step S100, and the resolution of the additional video is lower than that of the video in the step S100. In this embodiment, the computation time can be reduced because the image with low resolution can be obtained directly without performing the down-sampling operation.

Calculation of the pixel difference in step S120 may use several approaches such as temporal differencing, background subtraction, or optical flow. Taking temporal differencing for example, the pixel difference of each pixel may be calculated by comparing frames at different timestamps in the video. In one embodiment, step S120 includes comparing frames adjacent in time in the video, and subtracting a pixel value in the previous image frame from a pixel value in the current image frame. For an example that down-sampling is performed in the step S110, the following calculation equation may be used: $D(q_t)=|L(q_t)-L(q_{t-\delta})|$, where $D(q_t)$ represents the pixel difference of the pixel $q_t$ in the down-scaled image at time t, $\delta$ represents the time difference between adjacent frames. For example, for a video having a frame rate equal to 30 frames per second (fps), $\delta$ is 1/30 second. A person with ordinary skill in the art should appreciate that the frames under comparison in step S120 are not restricted to two adjacent frames, any two frames with different timestamps may be applicable.

In step S120, the pixel difference value may be calculated. The pixel difference value may present how the pixel difference of each pixel changes over time. For example, the pixel difference value of the pixel p at time points t, t+δ, t+2 δ, t+3 δ, t+4 δ, and so on.

In step S130, the video may be divided into multiple video segments. The time length of each video segment may be a predetermined value. Each video segment includes a group of frames. For example, if the length of one video segment is set as 1 second, then each video segment has 30 frames for a video having a frame rate 30 fps.

In step S140, a representative value for the pixel in each video segment may be calculated. Following the above example, every video segment has 30 frames, and hence 30 pixel difference values are obtained in the step S120. Based on these 30 pixel difference values, the representative value for this video segment may be determined in the step S140. By calculating the representative value in the step S140, the data amount can be effectively reduced, and the required storage space for the metadata file can be saved. For example, the pixel difference value ranges from 0 to 255, and thus each pixel requires 8 bits for storing the pixel difference value. For a down-sampled image with image resolution 90×60, the pixel difference of one down-sampled image requires 5,400 bytes of storage space. For a 24-hour video having 30 fps, it takes about 14 GB of storage space. After performing the step S140, one representative value is determined for each video segment (1 second), and then it takes about only 466 MB of storage space for storing the 24-hour video.

In one embodiment, the step S140 includes: in each video segment, using a maximum value of the pixel difference value of each pixel as the representative value. For example, the following equation may be used: $R(q_t)=\max_{u=t}^{t+N_{GOP}}\{D(q_u)\}$, where $R(q_t)$ is the representative value for the pixel $q_t$ in the video segment, $N_{GOP}$ is the number of image frames in the video segment. In the above example, the video segment is 1 second, and the frame rate is 30 fps, then $N_{GOP}=30$. If the time segment is 0.5 second, and the frame rate is 24 fps, then $N_{GOP}=12$.

The pixel difference values of the pixel p at time points t, t+δ, t+2 δ, t+3 δ, t+4 δ, and so on are considered. In the step S140, the maximum value of the pixel difference value in each video segment may be calculated and then used as the representative value for the video segment. In software implementation or hardware implementation, only the representative value for one video segment needs to be stored in the step S120. Then in the step S140, the representative value for this video segment may be calculated based on the pixel difference values for this video segment. When the video enters the next video segment, the representative value for the next video segment may be stored in the step S120.

Figure 4A:
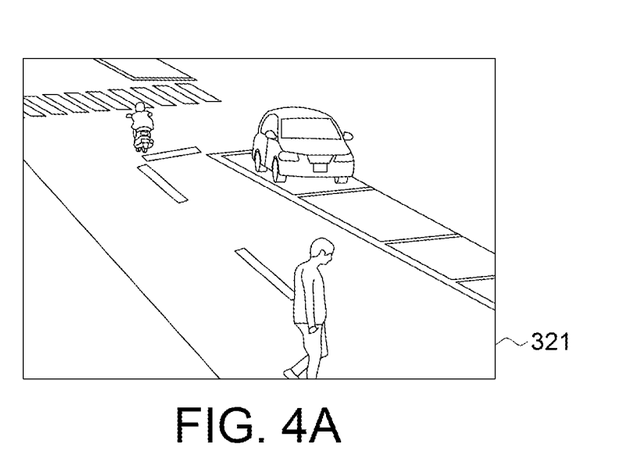
FIG. 4A shows an input captured image according to an embodiment of the disclosure.
Figure 4B:
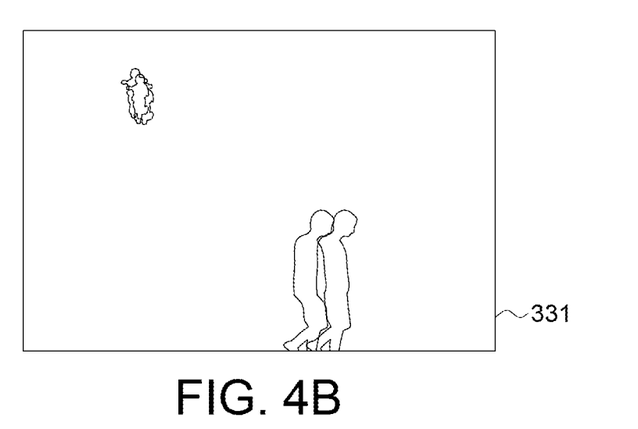
FIG. 4B shows an image of pixel difference according to an embodiment of the disclosure.

FIG. 4A shows an input captured image according to an embodiment of the disclosure. The input captured image 321 includes a pedestrian, a moving motorcycle, and an automobile parked on the roadside. The pixel difference may be calculated in the step S120, and the pixel difference may be stored in a form of a grayscale image. FIG. 4B shows an image of pixel difference according to an embodiment of the disclosure. FIG. 4B shows the pixel difference image 331 at one time point. In this example, the pedestrian walks from the left to the right of the screen, and thus two pedestrian profiles appear in the pixel difference image 331 (one profile corresponding to the previous image frame, the other profile corresponding to the current image frame).

Figure 4C:
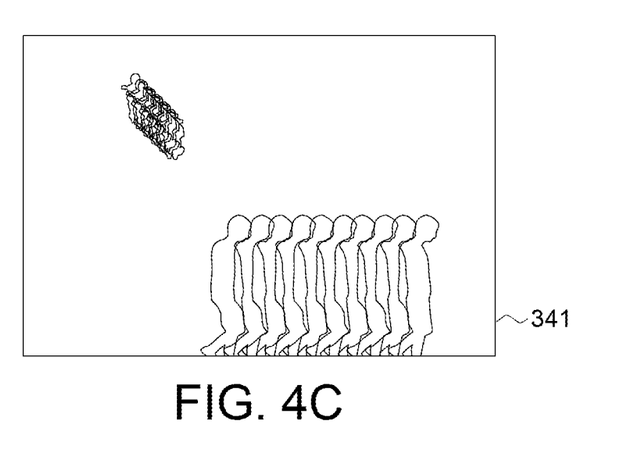
FIG. 4C shows an image of representative values according to an embodiment of the disclosure.

Next, based on multiple pixel difference images 331 shown in FIG. 4B in one video segment, a representative value image 341 for this video segment may be obtained in the step S140 through calculation. The calculation method is for example taking the maximum value of the pixel difference in this video segment for each pixel. FIG. 4C shows an image of representative values according to an embodiment of the disclosure. Because the maximum value of pixel difference of each pixel is used, multiple pedestrian profiles appear in the representative value image 341. The representative value image 341 may be regarded as a union of multiple pixel difference images 331 in one video segment.

Figure 5:
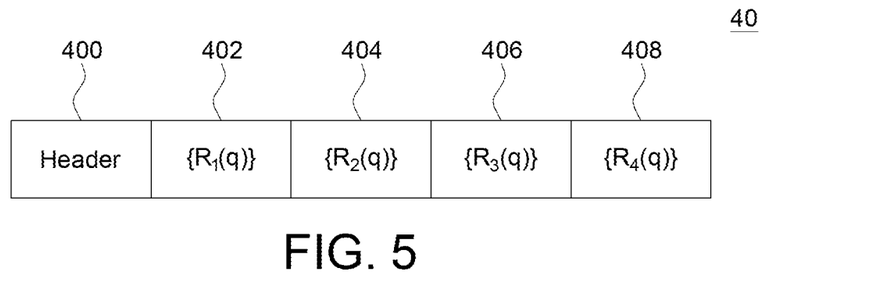
FIG. 5 shows a metadata file according to an embodiment of the disclosure.

In the step S150, the representative value obtained in the step S140 is written into a metadata file 40. FIG. 5 shows a metadata file according to an embodiment of the disclosure. The metadata file 40 may include multiple fields 400, 402, 404, 406, 408, where field 400 is the header, which may record information such as image size and start time. The fields 402, 404, 406, 408 sequentially record the representative values $\{R_1(q)\}$、$\{R_2(q)\}$、$\{R_3(q)\}$、$\{R_4(q)\}$ in each video segment. For example, $\{R_1(q)\}$ in the field 402 may include the representative values sequentially from the top-left to the bottom-right of the image in the first video segment.

Figure 6:
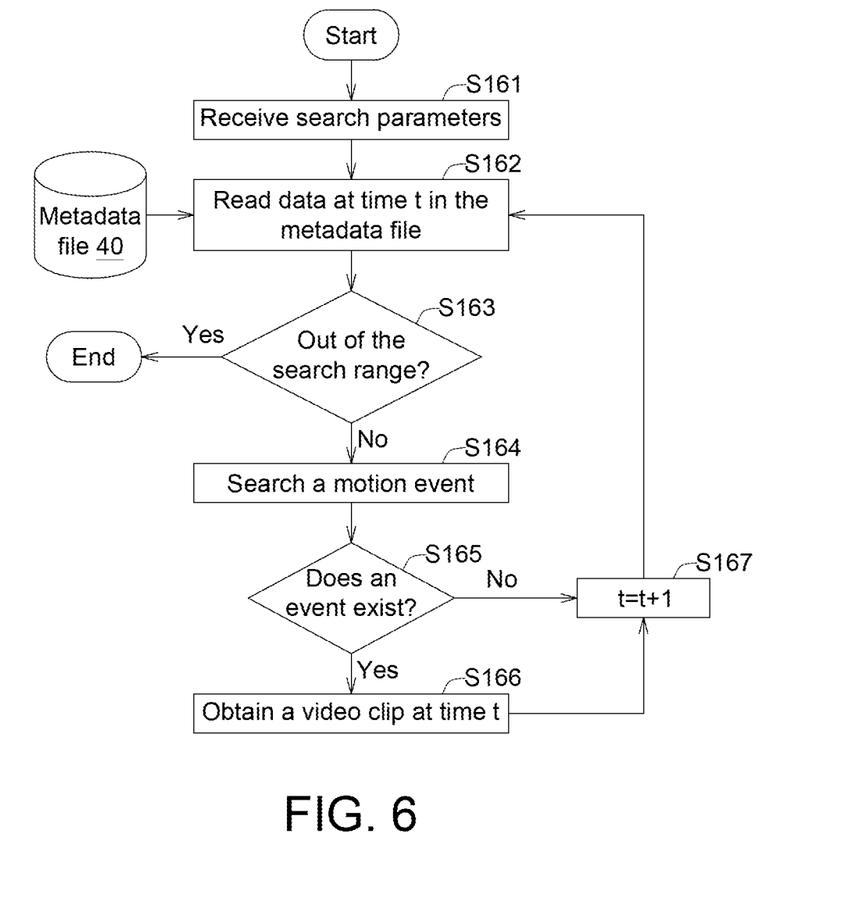
FIG. 6 shows a flowchart illustrating a method for searching an event according to the metadata file and the search parameters according to an embodiment of the disclosure.

The step S160 may include searching a video event according to the metadata file generated by the step S150. FIG. 6 shows a flowchart illustrating a method for searching an event according to the metadata file and the search parameters according to an embodiment of the disclosure. In this embodiment, the step S160 may include steps S161 through S167.

Step S161: receive search parameters, which may be related to a time period that the user is interested in, a specific region in the image, and a sensitivity for event detection. For example, the search parameters include at least one of the followings: an observation period, a region of interest (ROI), and a threshold value. The user may input search parameters through a user interface displayed on a screen. For example, the image may be divided into multiple rectangles on the screen, and the user may select one or more rectangles as the ROI (such as selecting by finger touch). Alternatively, the user may draw a ROI having an arbitrary polygon shape on the screen (such as drawing by a mouse). The threshold value is a parameter related to the sensitivity for event detection.

Step S162: read data at time t in the metadata file 40. That is, read the representative value. In one embodiment, an event in the video is searched according to the representative value for each pixel corresponding to the search parameters in the metadata file 40. Step S163: determine whether or not the current data is out of the search range. For example, the step 163 ends if the current time is out of the observation period specified by the user. Otherwise, if the current time is not out of the observation period, proceed to step S164 for searching motion an event. Step S165 may include determining whether or not an event exists. In one embodiment, the step S165 includes determining whether or not the pixel position is located in the ROI specified by the user, and determining an event occurs at a time and a pixel position (if inside the ROI specified by the user) corresponding to a first representative value when determining that the first representative value in the metadata file 40 is greater than the threshold value (this threshold value may be a search parameter input by the user in the step S161). If the determination result of the step S165 is that an event exists, proceed to step S166 to obtain a video clip at time t. Then proceed to step S167 to go forward to the next time segment (in this example a time segment is one second, so t=t+1). If the determination result of the step S165 is that no event exists, directly proceed to the step S167 to go to the next time segment.

As described above, in one embodiment, the event search in the step S160 involves reading data from the metadata file and performing some logic judgment operations. There is no need for image decoding, and thus the video clips corresponding to the events can be acquired quickly. In addition, because the event search in the step S160 is based on the metadata file, the user can decide the search parameters (step S161) after the metadata file has been generated (step S150), according to the flowchart shown in FIG. 6. As such, the user does not need to decide in advance which image region he is interested in or the sensitivity for event detection. The file output unit 250 can generate a universal metadata file 40 that is applicable to various search parameters. In this way, the usage flexibility of event search can be greatly improved. For example, a user X is more concerned about the parking lots for motorcycles at bottom-left of the image, while a user Y is more concerned about the parking lots for automobiles at top-right of the image. There is no need for a pre-setup while capturing the video. The user X and the user Y can use the same metadata file 40 to find the event they are interested in. In another example, if a user Z does not find the critical video clip he looks for, the user Z may attempt to change the input threshold value, and then perform event search on the same metadata file 40. Chances are the user Z will be able to obtain different video clips based on the new threshold value.

In one embodiment, the device for searching an event 2 may further include a video playback unit. The video playback unit includes, for example, a display screen, a display driving circuit, and a decoder. The video playback unit may obtain at least one event video clip in the video according to the execution result of the step S166. The one or more event video clips thus obtained might be continuous in time or not. The video playback unit may play only the at least one event video clip in the video. That is, video clips that do not contain an event may be skipped when playing the video, so as to reduce the viewing time when the user inspects the video. Consequently, the event(s) that the user is concerned about can be found out more quickly.

According to the method and device for searching an event in the embodiments given above, by performing event search with the aid of the metadata file, the video clips containing events can be acquired quickly. Moreover, the storage space required for the metadata file can be reduced by calculating the representative value. The computation time can also be reduced by optionally performing image down-sampling. Because the method and device of the embodiments provided in the disclosure have the features of low computation effort, low storage space requirements, and quick search, they do not require a large number of hardware circuits, and thus are suitable for embedded systems, such as IP cameras. In addition, it is easy to change search parameters when performing event search based on the metadata file, making the video event search more flexible and practical. With the increasing number of monitoring images in the life and the increasing video resolutions, the quick and flexible event search method provided by the embodiments of the present disclosure can be widely applied to fields such as police and home surveillance.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A method for searching a video event, comprising:
   capturing a video;
   obtaining a plurality of pixels corresponding to the video;
   calculating a pixel difference value of each pixel by comparing frames at different timestamps in the video;
   dividing the video into a plurality of video segments, each video segment including a group of frames;
   determining a representative value for each pixel in each video segment according to the pixel difference value of each pixel;
   generating a metadata file which records the representative value for each pixel in each video segment; and
   searching an event in the video according to the metadata file.

2. The method for searching the video event according to claim 1, wherein the determining the representative value for each pixel in each video segment comprises:
   in each video segment, using a maximum value of the pixel difference value of each pixel as the representative value.

3. The method for searching the video event according to claim 1, wherein the obtaining the plurality of pixels corresponding to the video comprises:
   down-sampling the video to obtain the plurality of pixels.

4. The method for searching the video event according to claim 1, wherein the obtaining the plurality of pixels corresponding to the video comprises:
 obtaining an additional video that is captured concurrently with the video, wherein a resolution of the additional video is lower than a resolution of the video; and
 obtaining the plurality of pixels from the additional video.

5. The method for searching the video event according to claim 1, wherein the searching the event in the video according to the metadata file comprises:
 receiving a search parameter;
 reading the metadata file; and
 obtaining the representative value for each pixel corresponding to the search parameter in the metadata file, and searching the event in the video accordingly.

6. The method for searching the video event according to claim 5, wherein the search parameter comprises at least one of an observation period, a region of interest, and a threshold value.

7. The method for searching the video event according to claim 6, wherein the searching the event in the video according to the metadata file further comprises:
 determining an event occurs at a time and a pixel position corresponding to a first representative value when determining that the first representative value in the metadata file is greater than the threshold value.

8. The method for searching the video event according to claim 1, further comprising:
 obtaining at least one event video clip in the video; and
 playing only the at least one event video clip in the video.

9. A device for searching a video event, comprising:
 an image capture unit, configured to capture a video;
 a data conversion unit, configured to obtain a plurality of pixels corresponding to the video;
 a difference calculation unit, configured to calculate a pixel difference value of each pixel by comparing frames at different timestamps in the video;
 a representative value calculation unit, configured to divide the video into a plurality of video segments, and to determine a representative value for each pixel in each video segment according to the pixel difference value of each pixel, each video segment including a group of frames;
 a file output unit, configured to generate a metadata file which records the representative value for each pixel in each video segment; and
 an event search unit, configured to search an event in the video according to the metadata file.

10. The device for searching the video event according to claim 9, wherein in each video segment, the representative value calculation unit is configured to use a maximum value of the pixel difference value of each pixel as the representative value.

11. The device for searching the video event according to claim 9, wherein the data conversion unit is configured to down-sample the video to obtain the plurality of pixels.

12. The device for searching the video event according to claim 9, wherein the data conversion unit is configured to obtain an additional video that is captured concurrently with the video, and to obtain the plurality of pixels from the additional video, wherein a resolution of the additional video is lower than a resolution of the video.

13. The device for searching the video event according to claim 9, wherein the event search unit is configured to:
 receive a search parameter;
 read the metadata file; and
 obtain the representative value for each pixel corresponding to the search parameter in the metadata file, and searching the event in the video accordingly.

14. The device for searching the video event according to claim 13, wherein the search parameter comprises at least one of an observation period, a region of interest, and a threshold value.

15. The device for searching the video event according to claim 14, wherein the event search unit is configured to determine an event occurs at a time and a pixel position corresponding to a first representative value when determining that the first representative value in the metadata file is greater than the threshold value.

16. The device for searching the video event according to claim 9, further comprising a video playback unit, configured to:
 obtain at least one event video clip in the video; and
 play only the at least one event video clip in the video.

17. A non-transitory computer readable medium storing a program that, when executed by a computer, causes the computer to perform operations including:
 capturing a video;
 obtaining a plurality of pixels corresponding to the video;
 calculating a pixel difference value of each pixel by comparing frames at different timestamps in the video;
 dividing the video into a plurality of video segments, each video segment including a group of frames;
 determining a representative value for each pixel in each video segment according to the pixel difference value of each pixel;
 generating a metadata file which records the representative value for each pixel in each video segment; and
 searching an event in the video according to the metadata file.

18. The non-transitory computer readable medium according to claim 17, wherein the determining the representative value for each pixel in each video segment comprises:
 in each video segment, using a maximum value of the pixel difference value of each pixel as the representative value.

19. The non-transitory computer readable medium according to claim 17, wherein the obtaining the plurality of pixels corresponding to the video comprises:
 down-sampling the video to obtain the plurality of pixels.

20. The non-transitory computer readable medium according to claim 17, wherein the obtaining the plurality of pixels corresponding to the video comprises:
 obtaining an additional video that is captured concurrently with the video, wherein a resolution of the additional video is lower than a resolution of the video; and
 obtaining the plurality of pixels from the additional video.

21. The non-transitory computer readable medium according to claim 17, wherein the searching the event in the video according to the metadata file comprises:
 receiving a search parameter;
 reading the metadata file; and
 obtaining the representative value for each pixel corresponding to the search parameter in the metadata file, and searching the event in the video accordingly.

22. The non-transitory computer readable medium according to claim 21, wherein the search parameter comprises at least one of an observation period, a region of interest, and a threshold value.

23. The non-transitory computer readable medium according to claim 22, wherein the searching the event in the video according to the metadata file further comprises:

determining an event occurs at a time and a pixel position corresponding to a first representative value when determining that the first representative value in the metadata file is greater than the threshold value.

24. The non-transitory computer readable medium according to claim 17, further comprising:
obtaining at least one event video clip in the video; and
playing only the at least one event video clip in the video.

\* \* \* \* \*